(12) United States Patent
Glässer

(10) Patent No.: US 8,014,892 B2
(45) Date of Patent: Sep. 6, 2011

(54) METHOD AND DEVICE FOR COMPENSATING FOR POSITIONAL AND SHAPE DEVIATIONS

(75) Inventor: Arndt Glässer, Dachau (DE)

(73) Assignee: MTU Aero Engines GmbH, Munich (DE)

(*) Notice: Subject to any disclaimer, the term of this patent is extended or adjusted under 35 U.S.C. 154(b) by 23 days.

(21) Appl. No.: 12/090,590

(22) PCT Filed: Oct. 17, 2006

(86) PCT No.: PCT/DE2006/001832
§ 371 (c)(1),
(2), (4) Date: Sep. 3, 2008

(87) PCT Pub. No.: WO2007/045223
PCT Pub. Date: Apr. 26, 2007

(65) Prior Publication Data
US 2009/0132080 A1 May 21, 2009

(30) Foreign Application Priority Data
Oct. 20, 2005 (DE) .......................... 10 2005 050 205

(51) Int. Cl.
*G06F 19/00* (2011.01)
*G06T 17/00* (2006.01)
*G01B 3/22* (2006.01)

(52) U.S. Cl. ........ 700/175; 345/420; 700/105; 700/159; 700/166; 700/193; 702/168

(58) Field of Classification Search .......... 700/175, 700/193, 105, 166, 159; 345/420; 702/168
See application file for complete search history.

(56) References Cited

U.S. PATENT DOCUMENTS

| | | | |
|---|---|---|---|
| 4,031,368 A | | 6/1977 | Colding et al. |
| 4,382,215 A | * | 5/1983 | Barlow et al. ............. 318/568.1 |
| 4,428,055 A | | 1/1984 | Zurbrick et al. |
| 4,499,359 A | | 2/1985 | Obara |
| 4,523,135 A | | 6/1985 | Kogawa |
| 4,555,610 A | * | 11/1985 | Polad et al. ............. 219/121.61 |
| 4,603,391 A | | 7/1986 | Inoue et al. |
| 4,605,886 A | * | 8/1986 | Inoue ........................... 318/565 |

(Continued)

FOREIGN PATENT DOCUMENTS
DE 36 20 422 C1 1/1988
(Continued)

OTHER PUBLICATIONS

Franse-J., "Manufacturing Techniques for Complex Shapes with Submicron Accuracy" 1990, Philips Research Lab, p. 1049-1094.*

(Continued)

*Primary Examiner* — Albert Decady
*Assistant Examiner* — Thomas Stevens
(74) *Attorney, Agent, or Firm* — Greer, Burns & Crain, Ltd.

(57) ABSTRACT

A method for compensating for at least one of positional deviations and shape deviations in NC-controlled cutting production machines where the method includes the steps of securing a new workpiece, processing the workpiece using the nominal data of the NC program, acquiring the set deviation data, optimizing the NC program using the acquired data and repeating these steps until at least one of required positional and shape tolerances have been achieved.

2 Claims, 3 Drawing Sheets

U.S. PATENT DOCUMENTS

| | | | |
|---|---|---|---|
| 4,731,607 A * | 3/1988 | Yoneda et al. | 345/581 |
| 4,748,554 A * | 5/1988 | Gebauer et al. | 700/174 |
| 4,790,697 A | 12/1988 | Hines et al. | |
| 4,816,729 A * | 3/1989 | Carlson | 318/568.24 |
| 4,864,520 A * | 9/1989 | Setoguchi et al. | 345/420 |
| 4,905,417 A * | 3/1990 | Oda et al. | 451/4 |
| 4,963,805 A * | 10/1990 | Suzuki et al. | 318/569 |
| 4,967,515 A | 11/1990 | Tsujiuchi et al. | |
| 4,992,948 A | 2/1991 | Pilland et al. | |
| 5,031,107 A | 7/1991 | Suzuki et al. | |
| 5,047,966 A * | 9/1991 | Crow et al. | 702/168 |
| 5,060,164 A * | 10/1991 | Yoneda et al. | 700/187 |
| 5,088,055 A * | 2/1992 | Oyama | 702/168 |
| 5,117,169 A | 5/1992 | Kakino et al. | |
| 5,355,705 A | 10/1994 | Schulze et al. | |
| 5,411,430 A | 5/1995 | Nishimura et al. | |
| 5,412,300 A * | 5/1995 | Meyer et al. | 318/568.11 |
| 5,465,474 A | 11/1995 | Kimura et al. | |
| 5,614,800 A * | 3/1997 | Nakano et al. | 318/568.18 |
| 5,691,909 A * | 11/1997 | Frey et al. | 700/159 |
| 5,710,709 A * | 1/1998 | Oliver et al. | 700/184 |
| 5,748,482 A | 5/1998 | Nishimura | |
| 5,815,400 A | 9/1998 | Hirai et al. | |
| 5,841,096 A | 11/1998 | Takahashi et al. | |
| 5,898,590 A | 4/1999 | Wampler et al. | |
| 5,903,459 A * | 5/1999 | Greenwood et al. | 700/110 |
| 5,910,040 A | 6/1999 | Moriyasu et al. | |
| 5,940,301 A | 8/1999 | Damman et al. | |
| 5,953,233 A * | 9/1999 | Higasayama et al. | 700/188 |
| 6,032,377 A | 3/2000 | Ichikawa et al. | |
| 6,233,533 B1 * | 5/2001 | Xu et al. | 702/91 |
| 6,246,920 B1 | 6/2001 | Mizuno et al. | |
| 6,256,546 B1 | 7/2001 | Graham et al. | |
| 6,535,788 B1 | 3/2003 | Yoshida et al. | |
| 6,539,642 B1 | 4/2003 | Moriyasu et al. | |
| 6,571,145 B1 | 5/2003 | Matsumiya et al. | |
| 6,681,145 B1 * | 1/2004 | Greenwood et al. | 700/193 |
| 6,823,235 B2 | 11/2004 | Toyozawa et al. | |
| 6,862,492 B2 | 3/2005 | Sagasaki et al. | |
| 6,892,153 B2 | 5/2005 | Puchtler | |
| 6,912,446 B2 * | 6/2005 | Wang et al. | 700/193 |
| 7,075,531 B1 * | 7/2006 | Ando et al. | 345/420 |
| 7,450,127 B2 * | 11/2008 | Hong et al. | 345/474 |
| 7,479,959 B2 * | 1/2009 | Han et al. | 345/420 |
| 7,686,988 B2 | 3/2010 | Hosoe | |
| 7,869,899 B2 * | 1/2011 | Hammond et al. | 700/194 |
| 2001/0012972 A1 | 8/2001 | Matsumoto et al. | |
| 2003/0018408 A1 * | 1/2003 | Sagae et al. | 700/200 |
| 2004/0083024 A1 * | 4/2004 | Wang | 700/195 |
| 2004/0174358 A1 * | 9/2004 | Takagi | 345/420 |
| 2007/0171223 A1 * | 7/2007 | McArdle et al. | 345/420 |
| 2009/0112357 A1 * | 4/2009 | Hammond et al. | 700/194 |
| 2010/0119104 A1 * | 5/2010 | Mamour et al. | 382/100 |

FOREIGN PATENT DOCUMENTS

| | | |
|---|---|---|
| EP | 0 326 625 A1 | 8/1989 |
| EP | 0 431 572 A2 | 6/1991 |
| WO | WO 2004/103622 A1 | 12/2004 |

OTHER PUBLICATIONS

Hatna et al., Automatic CNC Milling of Pockets: Geometric and Technological Issues:, 1998 Computer Integrated Manufacturing Systems, 22 pages.*

Tipton-H., "The Calculation of Tool Shapes for Electrical Machining" 1970, Machine Tool Industry Research Associates, 12 pages.*

Franse, J., "Manufacturing Techniques for Complex Shapes with Submicron Accuracy", *Rep. Prog. Phys.*, 53 (1990), pp. 1049-1094.

Hatna, A., et al., "Automatic CNC Milling of Pockets: Geometric and Technological Issues", *Computer Integrated Manufacturing Systems*, vol. II, No. 4, 1998, pp. 309-330.

Shong, et al., "Development of a Novel Coordinate Transposing Fixture System", *Advanced Manufacturing Technology*, 1997, 9 pages.

Tipton, H., "The Calculation of Tool Shapes for Electrochemical Machining", *Machine Tool Industry Research Association*, 1970, pp. 87-102.

* cited by examiner

METHOD AND DEVICE FOR COMPENSATING FOR POSITIONAL AND SHAPE DEVIATIONS

FIELD OF THE INVENTION

The present invention relates to a method for compensating positional and/or shape deviations in Numerical Control (NC)-controlled cutting production machines, and to an NC-controlled cutting production machine having a device for compensating positional and/or shape deviations in workpieces. During machining, in particular of materials that are difficult to machine and of labile components such as those often used in modern engine construction, as a rule there occur systematic positional and shape deviations that are caused primarily by the internal stress of the material and by pressure displacement of the tool or of the workpiece due to their elastic deformation. During processing using NC-controlled machines, these errors have the result that the milled geometry deviates from the programmed geometry, thus lying outside the tolerances according to the drawing.

BACKGROUND

When the existing material internal stresses of a workpiece are dismantled by milling, there often occur torsions or warpings that can assume significant dimensions depending on the component geometry, and that have the result that the geometry of the workpiece lies outside manufacturing tolerances. In addition, the tool and/or the workpiece are pressed out of the target position by the machining forces. The magnitude of the pressure depends essentially on the machining force and on the rigidity of the overall system consisting of the workpiece, the tool, and the machine.

These are undesirable effects that result in a high rejection rate, a high post-processing expense, and, therefore, increased manufacturing costs and high piece costs.

In addition, from the prior art NC-controlled cutting production machines are known. As a rule, in such machines the NC programs are nominally pre-programmed, during their creation, with the corresponding parameters, such as the positional and geometric data of the workpiece to be processed, and additional data such as data relating to, for example, advance speed and cutting speed.

In addition, for example from U.S. Pat. No. 4,660,148, input modules are known that are intended to permit certain data inputs to the NC machine to be made on location by an operator, including the inputting of non-variable data and geometric data of the workpiece. Here, positional and/or shape deviations due to material characteristics and/or tool characteristics are not taken into account.

Therefore, the object of the present invention is to provide an improved method and an improved device for compensating positional and shape deviations that avoid the disadvantages of the prior art, thus providing an economical solution with a reduced manufacturing expense.

SUMMARY

The present invention makes it possible to avoid the disadvantages of the prior art, and provides an economical solution with reduced manufacturing costs. The above-described positional and/or shape deviations are as a rule systematic errors that are compensated according to the present invention by returning the set difference or difference between the target value and the actual value to an NC program that controls the production device. In addition, deformations caused by the release of material internal stresses are compensated. Moreover, transitions between tools having different pressure displacements can be compensated. It is also possible to compensate shape deviations caused by non-uniform finishing, i.e., pre-finishing for constant allowance oversizing situation during finishing is no longer required. In this way, operating sequences can be significantly reduced.

According to the present invention, a method is proposed for compensating positional and/or shape deviations in NC-controlled cutting production machines, the method having the following steps:
securing a new workpiece; processing the workpiece using nominal data of the NC program; acquiring set deviation data; optimizing the NC program using the acquired data; and repeating steps a) to d) until at least one of required positional and shape tolerances are achieved.

Here, the "nominal" data of the NC program are the theoretical or design values inputted by the programmer in a first run of the NC program, and the data automatically optimized by the NC program in the subsequent iterative steps or steps on the basis of the measured values.

The control loop is situated quasi-externally to the NC machine. The sections of the component that are to be corrected are first nominally milled. Subsequently, the set deviations are acquired and are returned to the NC program. The next component is then manufactured using the optimized NC program. This process is iteratively repeated until the required positional and shape tolerances have been achieved.

An alternative method according to the present invention for compensating positional and shape deviations in NC-controlled cutting production machines has the following steps:
preparing a workpiece in which an allowance is greater than at least one of a maximum positional deviation and a shape deviation that is to be expected; acquiring deviation data; optimizing the NC program using the acquired data; and finishing of the workpiece using a modified NC program.

This represents a second method for returning the set deviation to the NC program. In this method, the closed control loop is run within the NC processing machine during the processing of an individual component. Here, in a first step the component is processed in such a way that the segments of the component that are to be corrected are first only first-finished. The finishing allowance must be greater than the maximum positional and shape deviations that are to be expected. In a second step, the set deviation for the first-finished areas is acquired by corresponding measurement devices inside the machine. In a further step, the determined deviations are then returned to the NC program and are automatically implemented in this program. The component is then finally milled using the optimized finishing program. For the next component, this method is repeated in the same way, so that it is also possible to compensate for non-systematic, individual flaws in an individual workpiece.

Given an external control loop, the NC program is optimized for one component, or, iteratively, for a plurality of components. If the set deviation lies within the allowable tolerance, all following components can then be processed using the same NC program without further optimization. Given an internal control loop, the program optimization takes place individually for each component.

An advantageous development of the method according to the present invention provides that the acquisition of the set deviation takes place using a tactile measurement method or an optical measurement method. In order to acquire the set deviation, all measurement or test methods may be used with which the deviation can be determined with the required quality and quantity. Inter alia, the acquisition can be carried out using tactile systems (measurement probes), e.g.: measurement machines or measurement probes inside the processing machine; optical acquisition (laser triangulation, extended optical measurement systems) inside or outside the processing machine are also possible measurement methods. However, acquisition can also take place using manual measurement means or special measurement means.

Another advantageous development of the method according to the present invention provides that the returning of the set deviation to the NC program takes place in such a way that a correction vector is allocated to each support point of the tool path. The correction vector consists of the magnitude and the direction of the set deviation. Each support point of the tool path is then displaced by the associated correction vector.

An advantageous development of the method according to the present invention provides that the determination of the correction vectors takes place in such a way that the actual geometry is set into clear comparison with the target geometry. The correction vectors are determined by placing the acquired actual geometry, i.e. the determined measurement data, into comparison with the target geometry, determined for example from a CAD model. Here it is of decisive importance that the corresponding regions or support points be set off against one another.

An advantageous development of the method according to the present invention provides that the clear comparison between the associated areas be defined by synchronizing markings that are set between areas having a strong curvature change. Synchronizing markings are always to be placed between areas between which the curvature changes strongly. If all measurement points, i.e. the actual geometry, are set into relation with the associated points in the CAD model, i.e. the target geometry, a vector field is obtained with which the corresponding support points of the NC program can be adjusted. The clear comparison between the correction vectors of the vector field and the NC program is produced using the same synchronizing markings that were already used for the actual geometry and the target geometry.

An NC-controlled cutting production machine according to the present invention having a device for compensating positional and/or shape deviations in workpieces comprises the following: a control unit that has a storage unit for storing a target geometry of a workpiece, a measurement device for acquiring the actual geometry of a workpiece, and a computing unit for calculating the set deviation, which controls the further processing of the workpiece, or automatically optimizes the NC program, corresponding to the set deviation.

These components are advantageously integrated into the production machine, but can also be situated outside the machine, in the case of what is called an external control loop.

An advantageous specific embodiment of the NC-controlled cutting production machine is an NC-controlled milling machine.

An advantageous specific embodiment of the NC-controlled cutting production machine has tactile or optical measurement devices for acquiring the actual geometry. The tactile or optical measurement devices are advantageously integrated into the actual cutting machine, but here it is also possible for the measurement devices to be connected externally.

BRIEF DESCRIPTION OF THE DRAWINGS

Additional measures that improve the present invention are indicated in the subclaims, and are shown in more detail below together with the description of a preferred exemplary embodiment of the present invention on the basis of the Figures.

DETAILED DESCRIPTION

Figure 1:
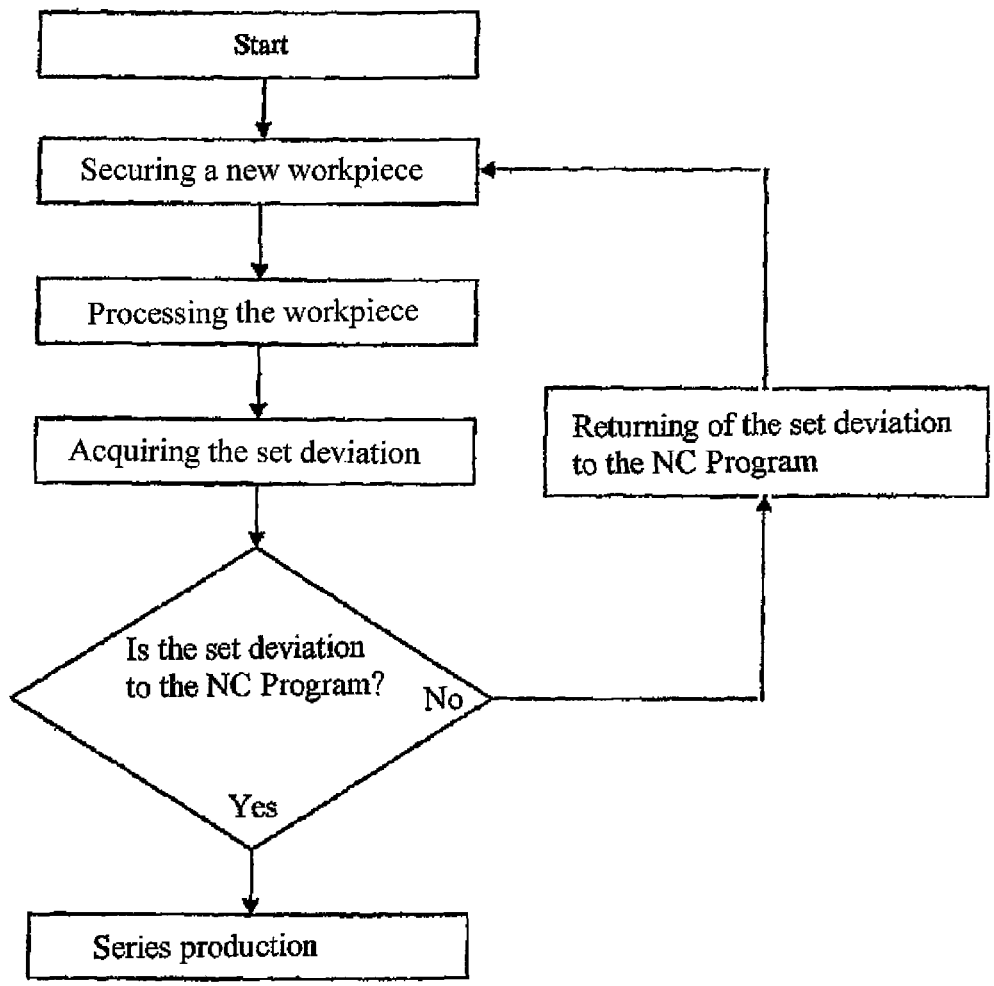
FIG. 1 shows a flow diagram of a first specific embodiment of a method according to the present invention.

FIG. 1 shows a flow diagram of a first specific embodiment of a method according to the present invention for compensating positional and shape deviations in an NC-controlled cutting production machine.

The control loop takes place outside the NC machine. The parts of the component that are to be corrected are first nominally milled. Subsequently, the set deviations are acquired and are returned to the NC program. The next component is then manufactured using the optimized NC program. This process is iteratively repeated until the required positional and shape tolerances are achieved.

With the external control loop, the NC program is optimized to one component, or is iteratively optimized to a plurality of components. If the set deviation lies within the allowable tolerance, all subsequent components can then be processed using the same NC program without further optimization.

Figure 2:
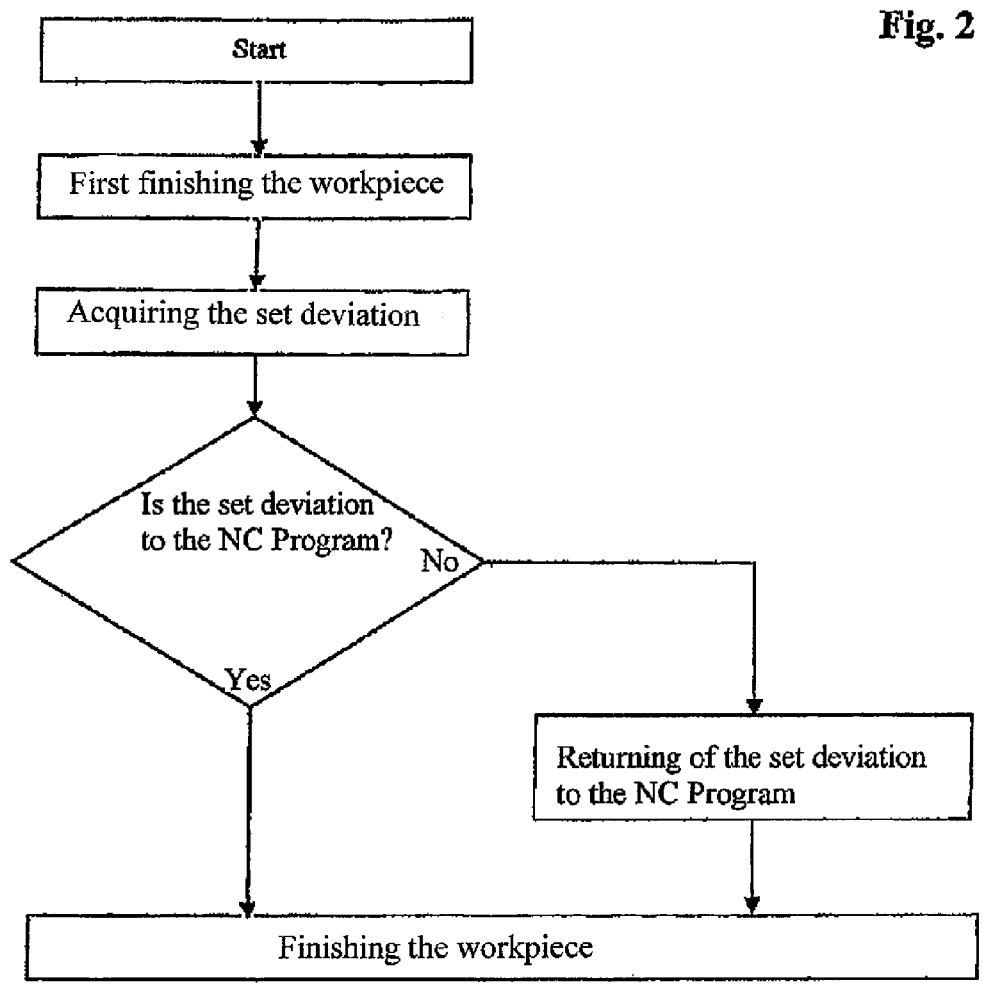
FIG. 2 shows a flow diagram of a second specific embodiment of a method according to the present invention.

FIG. 2 shows a flow diagram of a second specific embodiment of a method according to the present invention for compensating positional and shape deviations in an NC-controlled milling machine. In this method, the closed control loop is executed inside the NC processing machine during the processing of each individual component. After the start of the method, in a first step the component secured or chucked in the processing machine is first-finished. The finishing allowance must be greater than the maximum positional and shape deviations that are to be expected, because otherwise the workpiece will be rejected as scrap. In a second step, the set deviation is acquired for the first-finished areas by corresponding measurement devices inside the machine; in the present exemplary embodiment, these are automatic probes. The determined measurement results are then returned to the NC program in an additional step. For the case in which the set deviation is within the allowable tolerance, i.e. in the case of a yes-branching, the component is processed to the finished state. For the case in which the set deviation is not within the allowable tolerance, i.e. in the case of a no-branching, the deviation is automatically implemented into the NC program, and another finishing pass is carried out. The component is then milled to a finished state using the optimized finishing program. For the next component, this method is executed in the same way.

Figure 3:
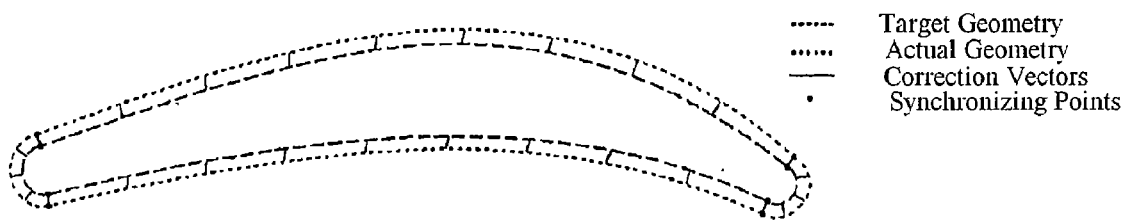
FIG. 3 shows a first example of positional and shape deviations during the milling of a flow profile.
Figure 4:
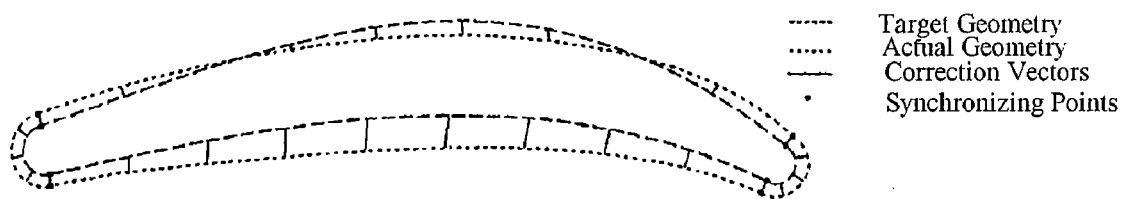
FIG. 4 shows a second example of positional and shape deviations during the milling of a flow profile.
Figure 5:
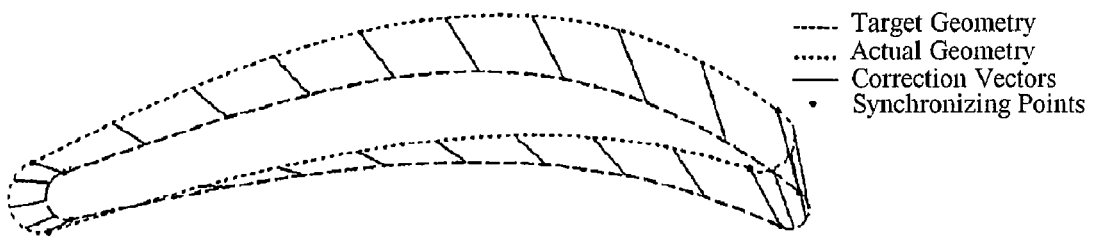
FIG. 5 shows a third example of positional and shape deviations during the milling of a flow profile.

The illustrations in FIG. 3 to FIG. 5 show some examples of positional and shape deviations during the milling of a flow profile, as occur for example during the manufacture of blades for turbo engines. Here, the target geometry of a flow profile 1 is shown by a broken line. The dotted line shows the actual geometry. The deviations between the actual geometry and the target geometry are represented by correction vectors. In addition, synchronization points are shown in the area of the profile nose and the profile rear edge.

FIG. 3 shows a circumferentially constant shape deviation, i.e., the deviations of the actual geometry from the target geometry are equally large at all points of the profile contour. The profile is oversized at all points of its geometry.

FIG. 4 shows an example of a flow profile having shape deviations that are not constant over the entire contour. The profile is undersized in the suctioning area, i.e., the actual geometry lies inside the target geometry at some points.

Finally, FIG. 5 shows an example of a flow profile having positional and shape deviations.

The invention claimed is:

1. A method for compensating for at least one of positional deviations and shape deviations in NC-controlled cutting production machines having an NC program, the method having the following steps:
   a) securing a workpiece;
   b) processing the workpiece using nominal data of the NC program, wherein the nominal data includes design values of the workpiece;
   c) acquiring set deviation data which is based on differences between the nominal data and measured values of the workpiece;
   d) optimizing the NC program using the acquired set deviation data;
   e) repeating steps a) to d) until at least one of required positional and shape tolerances have been achieved;
   f) returning of the set deviation data wherein a correction vector is allocated to each support point of a tool path;
   g) determining each correction vector by setting an actual geometry into clear comparison with a target geometry; and
   h) defining the clear comparison between associated regions by placing the correction vectors between areas having a change in curvature.

2. A method for compensating for positional and shape deviations in NC-controlled cutting production machines having an NC program, the method having the following steps:
   a) preparing a workpiece in which an allowance is greater than at least one of a maximum positional deviation and a shape deviation that is to be expected;
   b) acquiring set deviation data which is based on differences between design values and measured values of the workpiece;
   c) optimizing the NC program using the acquired set deviation data; and
   d) finishing of the workpiece using a modified NC program;
   e) returning of the set deviation data, wherein a correction vector is allocated to each support point of a tool path;
   f) determining each correction vector by setting an actual geometry into clear comparison with a target geometry; and
   g) defining the clear comparison between associated regions by placing the correction vectors between areas having a change in curvature.

* * * * *